United States Patent [19]
Brost

[11] 3,880,754
[45] Apr. 29, 1975

[54] FILTERING WITH POLYACRYLONITRILE OR POLYAMIDE FIBERS AS FILTER AID

[75] Inventor: Hans R. Brost, Leverkusen, Germany

[73] Assignee: Bayer Aktiengesellschaft, Leverkusen, Germany

[22] Filed: Apr. 12, 1974

[21] Appl. No.: 460,358

Related U.S. Application Data

[63] Continuation of Ser. No. 232,949, March 8, 1972, abandoned.

[30] Foreign Application Priority Data

Mar. 12, 1971 Germany............................ 2111855

[52] U.S. Cl.................................. 210/75; 210/505
[51] Int. Cl............................................ B01d 39/04
[58] Field of Search ....... 210/75, 503, 505, DIG. 21

[56] References Cited
UNITED STATES PATENTS

| | | | |
|---|---|---|---|
| 2,301,430 | 11/1942 | Malanowski | 210/75 |
| 3,252,270 | 5/1966 | Pall et al. | 210/505 X |
| 3,368,678 | 2/1968 | Gilbert | 210/75 |
| 3,618,766 | 11/1971 | Morey | 210/75 |
| 3,707,398 | 12/1972 | Charlesworth | 210/75 X |
| 3,716,483 | 2/1973 | Renner | 210/DIG. 21 |

*Primary Examiner*—John Adee
*Attorney, Agent, or Firm*—Connolly and Hutz

[57] ABSTRACT

The invention is related to the field of settling filtration and claims a method of filtering a liquid suspension wherein ground polyarcylonitrile or polyamide fibres having a fibrous structure are added to the suspension before filtration and wherein settling filtration is carried out by a method known per se.

2 Claims, No Drawings

THE FILTERING WITH POLYACRYLONITRILE OR POLYAMIDE FIBERS AS FILTER AID

CROSS REFRENCES TO RELATED APPLICATION

This application is a continuation of application Ser No. 232,949 filed Mar. 8, 1972, now abandoned.

This invention relates to a filtration aid consisting of ground synthetic fibres for use in settling filtration.

Settling filtration is used for the purification and filtration of liquids. The filters employed are very effective and have the advantage of requiring only limited space. The filters generally consist of a container which has internal horizontally or vertically arranged plates or vertically depending or upright candles. The constituent material of the plates and candles is commensurate with the purpose for which the filter is used. For example, it can be a cloth made from refined steel. By contrast, it is possible in the case of candles successfully to use even those wound from fibres or those formed from a variety of different sinter materials (for example carbo-candles).

Settling layers are applied to the systems described above for a number of reasons. On the one hand, the filtration effect is considerably enhanced whilst, on the other hand, the plate or candle systems are protected against progressive soiling. Numerous proposals have been put forward in regard to the settling material. Suspensions of kieselguhr and/or asbestos are frequently used. Ground ion exchangers have proved to be particularly effective for the working-up of condensates in heat-engine generating stations because, in addition to the mechanical filtration, ion exchange takes place. In many cases, a fibrous cellulose powder is sufficient for mechanical separation on economic grounds.

All conventional filtering aids have the disadvantage that they transfer undesirable substances to the solution to be filtered. Thus, where kieselguhr or asbestos is used, a considerable proportion of silica enters the solution to be filtered even at room temperature. Where cellulose powder is used salts are given off to the water and their presence in the filtrate is reflected by an increase in conductivity. Added to this is the fact that cellulose cannot be used at temperatures above 40°C because even at temperatures as low as these the cellulose undergoes thermal degradation which is further accelerated when working in an alkaline medium. Organic degradation products such as these have an adverse effect for example upon water-vapour circuits.

The present invention relates to a filtration aid consisting of ground polyacrylonitrile or polyamide fibres which still show a fibrous structure. Ground polyacrylonitrile or polyamide fibres with a denier range of from 1 to 50 dtex are preferably used as the filtration aid. The use of these ground polyacrylonitrile or polyamide fibres as a filtration aid in settling filtration affords significant advantages over conventional filtration aids by virtue of their outstanding thermal and chemical stability. In addition, it has been found that mechanical separation is better by comparison with conventional filtration aids. This applies both as regards the absorption capacity of the settling layer in regard to the suspended matter and as regards the residual content of such suspended matter in the treated water.

In addition, it is only necessary to use half the quantity by comparison with conventional filtration aids to obtain comparable filtration effects. Normally, the filtration aid is used in a quantity of 1 kg per square metre of filter surface. Where the filtration aids according to the invention are used, it is possible by employing a quantity of 0.5 kg/m² of filter surface to obtain a settling layer having a thickness which, where conventional filtration aids are used, could only be obtained by employing a quantity of 1 kg/m² of filter surface.

In settling filtration, a desalting and/or decolouring effect is obtained in addition to the mechanical separation where the settling layer consists of filtration aid and one or more absorbents. Additional absorbents such as these include for example ground ion exchangers and/or active carbon. Where ground ion exchangers and/or active carbon are added to the filtration aids according to the invention, a settling layer with outstanding filtration properties coupled with a particularly high absorption capacity for suspended matter is obtained. The absorption capacity increases with increasing temperature so that the use of combinations such as these of absorbents and ground fibres according to the invention at elevated temperatures, for example in the range from 50° to 100°C, is not only possible, it is even of advantage. By comparison, combinations of conventional filtration aids and absorbents, such as for example the combination of cellulose and active carbon, have the disadvantage that, on the one hand, they form a very dense and substantially impervious layer and, on the other hand, give off degradation products of the filtration aids to the medium to be treated at elevated temperatures.

The invention is illustrated by the following Examples:

EXAMPLE 1 (Comparison Example)

A condensate-treating installation was used in which the suspended matter was retained by a settling filter with a filter surface of 40 sq. metres. A suspension of regenerated cellulose fibre powder was used in a total quantity of 40 kg. in order to form a settling layer. Following homogenization in the settling vessel, settling took place in a matter of 6 to 7 minutes. The filter was then switched into the condensate stream cooled to 30°C. A pressure loss of 0.3 kg/cm² was obtained at a metric filtration rate of 9.2 m/hour. The iron content of the effluent fluctuated between 5 and 15 µg of Fe per litre. Filtration was stopped at a pressure loss of 1.6 kg/cm² by which time the filter had been in use for 146.5 hours and the throughput of water amounted to 53912 m³. Analysis of the settling layer showed that 11g of suspended matter had been absorbed per sq. metre of filter surface.

EXAMPLE 2

The procedure was as in Example 1 except that 20 kg of ground polyacrylonitrile fibres were used as a filtration aid. The pressure loss amounted to 0.2 kg/cm² at the corresponding metric rate of 9.2 m/hr. The effluent had an iron content of around 5 µg of Fe per litre. Filtration was stopped when the pressure loss amounted to 1.6 kg/cm². At this point, the filter had been in use for a period of 376 hours and the throughput of water amounted to 135360 m³. Analysis of the settling layer showed that 89 g of suspended matter had been absorbed per sq. metre of filter surface.

EXAMPLE 3

Following homogenisation, 20 kg of ground polyacrylonitrile fibres were deposited in the installation described in Example 1.

The condensate to be treated had an average temperature of 89°C.

A pressure loss of 0.28 kg/cm$^2$ was measured at a filtration rate of 9.35 m/hour. After a period in service of 445 hours (= 166,430 m$^3$), a pressure loss of 165 kg/cm$^2$ was obtained. During this period, the iron content of the effluent was on average 8 μg/litre. Analysis of the settling layer showed that 108 g of suspended matter had been absorbed per sq. metre of filter surface.

EXAMPLE 4

350 g of ground polyamide-6 fibres were deposited in a test installation with a filter surface of 0.7 m$^2$. The condensate to be treated had an average temperature of 91°C. The hourly throughput amounted to approximately 650 litres corresponding to a metric filtration rate of 9.3 metres/hour. The pressure loss settled at 0.3 kg/cm$^2$ and rose over 326 hours to 1.6 kg/cm$^2$. The iron content of the effluent was always less than 10 μg/litre. Analysis of the settling layer showed that 82 g of suspended matter had been absorbed per sq. metre of the filter surface.

EXAMPLE 5

The following tests were carried out to determine to what extent ions and organic substances are given off to the treated water.

20 g of the different filtration aids were suspended in 250 ml. of demineralised water.

After a running time of 72 hours at 95°C. the following results were obtained:

| Filtration Aids | Oxidisability mg KMnO$_4$/l of extract | Conductivity μS/cm (20°C) |
|---|---|---|
| demin. water | 2.2 | 0.5 |
| regenerated cellulose powder | 184 | 85 |
| ground polyamide-6 | 3.2 | 5.2 |
| ground polyacrylonitrile | 3.0 | 5.8 |

EXAMPLE 6

Following homogenisation, 35 g of ground polyacrylonitrile fibres, 15 g of a standard commercial-grade active carbon for bleaching saccharine juices and 2.5 g of a strongly basic macroporous anion exchanger resin in powder form were deposited in a test installation with a filter candle having a filter surface of 6/dm$^2$. A dilute molasses test solution with a temperature of 75°C was applied to the filter at a metric rate of 2.5 m/hour. The colouring matter content of the test solution at extinction measured at 420 nm amounted to 0.25/5 cm layer length The filter effluent was completely clear. During a running time of 4.5 hours, the residual colour amounted to E = 0.05/5 cm of layer length. However, the absorption capacity for suspended matter was still not exhausted. The pressure loss only amounted to 0.54 kg/cm$^2$, having been 0.18 kg/cm$^2$ at the beginning of filtration.

EXAMPLE 7

46.5 kg of cation exchanger resin ($NH_4^+$-form) [cation resin in powder form], 10 g of anion exchanger resin in powder form ($OH^-$-form) and 35 g of ground polyamide fibres were deposited in an installation of the kind described in Example 5 with a filter surface of 0.12 m$^2$:

After homogenisation and settling, the filtration layer was approximately 6 mm. thick.

The inflowing water had a temperature of 65°C. and the electrolyte consisted of NaCl and NaOH. A conductivity of an average 1.33 μS/Cm was recorded in the inflow. After a running time of 17.5 hours, the conductivity of the effluent reached 0.5 μs/cm. A capacity of 0.28 mval/g was calculated for the cation exchanger up to failure, and one of 1.39 mval/g for the anion exchanger.

At the beginning of filtration, the pressure loss amounted to 0.11 kg/cm$^2$ and at failure had risen to 0.15 kg/cm$^2$.

What we claim is:

1. In the process of desalting or decoloring an aqueous solution with a filter aid by forming a suspension of the filtering medium, including a filtering aid, homogenizing said suspension, applying the solids content of the suspension as a homogeneous layer and passing the aqueous solution to be filtered therethrough, the improvement which comprises employing as said homogeneous layer a mixture of a cation and an anion exchange resin together with a filter aid comprising ground fibers of polyacrylonitrile, a polyamide or a mixture thereof.

2. The process of claim 1 wherein the ground fibers having a denier range of 1 to 50 dtex.

* * * * *